(12) United States Patent
Parikh et al.

(10) Patent No.: US 7,439,988 B1
(45) Date of Patent: *Oct. 21, 2008

(54) APPARATUS, SYSTEM, AND METHOD FOR CLIPPING GRAPHICS PRIMITIVES WITH RESPECT TO A CLIPPING PLANE

(75) Inventors: Vimal S. Parikh, Fremont, CA (US); Henry Packard Moreton, Woodside, CA (US); Lordson L. Yue, Foster City, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,200

(22) Filed: Dec. 5, 2005

(51) Int. Cl.
*G09G 5/00* (2006.01)

(52) U.S. Cl. .................. 345/620; 345/619; 345/622

(58) Field of Classification Search ......... 345/619–624, 345/584, 418
See application file for complete search history.

(56) References Cited

U.S. PATENT DOCUMENTS

| | | | |
|---|---|---|---|
| 3,889,107 A | 6/1975 | Sutherland | |
| 4,958,305 A | 9/1990 | Piazza | |
| 5,051,737 A | 9/1991 | Akeley et al. | |
| 5,224,210 A | 6/1993 | Pinedo et al. | |
| 5,420,980 A | 5/1995 | Pinedo et al. | |
| 5,428,779 A | 6/1995 | Allegrucci et al. | |
| 5,444,838 A * | 8/1995 | Kommrusch et al. | 345/620 |
| 5,455,958 A | 10/1995 | Flurry et al. | |
| 5,564,009 A | 10/1996 | Pinedo et al. | |
| 5,572,657 A | 11/1996 | Pinedo et al. | |
| 5,613,052 A | 3/1997 | Narayanaswami | |
| 5,720,019 A | 2/1998 | Koss et al. | |
| 5,838,331 A * | 11/1998 | DeBry | 345/584 |
| 5,877,773 A | 3/1999 | Rossin et al. | |
| 5,949,421 A | 9/1999 | Ogletree et al. | |
| 5,986,669 A | 11/1999 | Kirkland | |
| 6,052,129 A | 4/2000 | Fowler et al. | |
| 6,061,066 A | 5/2000 | Priem | |
| 6,137,497 A | 10/2000 | Strunk et al. | |
| 6,181,352 B1 | 1/2001 | Kirk et al. | |
| 6,208,361 B1 | 3/2001 | Gossett | |
| 6,359,630 B1 | 3/2002 | Morse et al. | |
| 6,459,438 B1 | 10/2002 | Mang | |
| 6,507,348 B1 * | 1/2003 | Mang et al. | 345/622 |
| 6,552,723 B1 | 4/2003 | Duluk, Jr. et al. | |
| 6,577,305 B1 | 6/2003 | Duluk, Jr. et al. | |
| 6,597,363 B1 | 7/2003 | Duluk et al. | |
| 6,621,495 B1 | 9/2003 | Cook et al. | |
| 6,686,924 B1 * | 2/2004 | Mang et al. | 345/620 |
| 6,782,432 B1 | 8/2004 | Nelson et al. | |

(Continued)

OTHER PUBLICATIONS

U.S. Appl. No. 11/195,389, filed Aug. 2, 2005, Moreton et al.

*Primary Examiner*—Chante Harrison
(74) *Attorney, Agent, or Firm*—Cooley Godward Kronish LLP

(57) ABSTRACT

Apparatus, system, and method for clipping graphics primitives are described. In one embodiment, a clipping module includes a mapping unit and a clipping engine that is connected to the mapping unit. The mapping unit is configured to map a graphics primitive onto a canonical representation that is defined with respect to a clipping plane. The clipping engine is configured to clip the graphics primitive with respect to the clipping plane based on the canonical representation.

15 Claims, 4 Drawing Sheets

U.S. PATENT DOCUMENTS 6,928,646 B1    8/2005   James et al.
7,088,359 B2 *  8/2006   Huang et al. ................ 345/619
7,292,242 B1    11/2007  Wittenbrink et al.
7,292,254 B1 *  11/2007  Yue et al. .................... 345/620
2003/0095137 A1  5/2003  Lu et al.

* cited by examiner

APPARATUS, SYSTEM, AND METHOD FOR CLIPPING GRAPHICS PRIMITIVES WITH RESPECT TO A CLIPPING PLANE

BRIEF DESCRIPTION OF THE INVENTION

The invention relates generally to graphics processing. More particularly, the invention relates to an apparatus, system, and method for clipping graphics primitives with respect to a clipping plane.

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons.

Conventional graphics processing systems sometimes implement techniques for clipping graphics primitives. Clipping typically refers to a set of operations that determine which portions of an object are to be displayed with respect to a set of clipping planes. Various techniques have been developed for clipping graphics primitives. Of these techniques, the Sutherland-Hodgeman technique is perhaps the most commonly used. The Sutherland-Hodgeman technique can be used to clip a polygon with respect to a set of clipping planes by using an output from a set of clipping operations with respect to one clipping plane as an input for a set of clipping operations with respect to another clipping plane, and so on until all clipping planes have been processed. For example, to clip a polygon with respect to six clipping planes, the Sutherland-Hodgeman technique typically clips each edge of the polygon with respect to a first clipping plane to produce a first clipped polygon. Each edge of the first clipped polygon is then typically clipped with respect to a second clipping plane to produce a second clipped polygon. The second clipped polygon is then typically clipped with respect to a third clipping plane, and so on until all six clipping planes have been processed.

Conventional clipping techniques can be computationally intensive, particularly when clipping polygons with respect to multiple clipping planes. In the case of the Sutherland-Hodgeman technique, each clipping operation with respect to a particular clipping plane can involve a number of computationally intensive data manipulations. One significant drawback of the Sutherland-Hodgeman technique is that this technique typically clips a polygon with respect to all clipping planes even if the polygon simply requires clipping with respect to a subset of the clipping planes. Indeed, in many instances, the polygon simply requires clipping with respect to a single one of the clipping planes. Another significant drawback of the Sutherland-Hodgeman technique is that this technique typically clips all edges of a polygon with respect to a particular clipping plane even if simply a subset of the edges requires clipping with respect to that clipping plane. Indeed, in many instances, simply a pair of the edges requires clipping with respect to that clipping plane. As a result of these drawbacks, the Sutherland-Hodgeman technique can lead to inefficiencies in terms of performing unnecessary clipping operations. In particular, such inefficiencies can translate into processing times that are longer than desired and that are relatively unpredictable, particularly since a number of edges to be clipped can increase in a variable manner after clipping is performed with respect to each successive clipping plane. In addition, such inefficiencies can translate into enhanced implementation cost and complexity.

It is against this background that a need arose to develop the apparatus, system, and method described herein.

SUMMARY OF THE INVENTION

In one aspect, the invention relates to a clipping module. In one embodiment, the clipping module includes a mapping unit and a clipping engine that is connected to the mapping unit. The mapping unit is configured to map a graphics primitive onto a canonical representation. The clipping engine is configured to clip the graphics primitive with respect to a clipping plane based on the canonical representation. The canonical representation is defined with respect to the clipping plane so as to accelerate clipping the graphics primitive.

In another aspect, the invention relates to a graphics processing apparatus. In one embodiment, the graphics processing apparatus includes a clipping module. The clipping module is configured to determine that a graphics primitive intersects a clipping plane. The clipping module is also configured to map the graphics primitive onto a canonical representation that is defined with respect to the clipping plane. The clipping module is further configured to clip the graphics primitive with respect to the clipping plane based on the canonical representation.

In a further aspect, the invention relates to a graphics processing method. In one embodiment, the graphics processing method includes determining a positioning of vertices defining a graphics primitive with respect to a clipping plane, the vertices having an initial order. The graphics processing method also includes sorting the vertices based on the positioning so as to have a canonical order. Clipping the graphics primitive with respect to the clipping plane is accelerated by accessing the vertices based on the canonical order.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
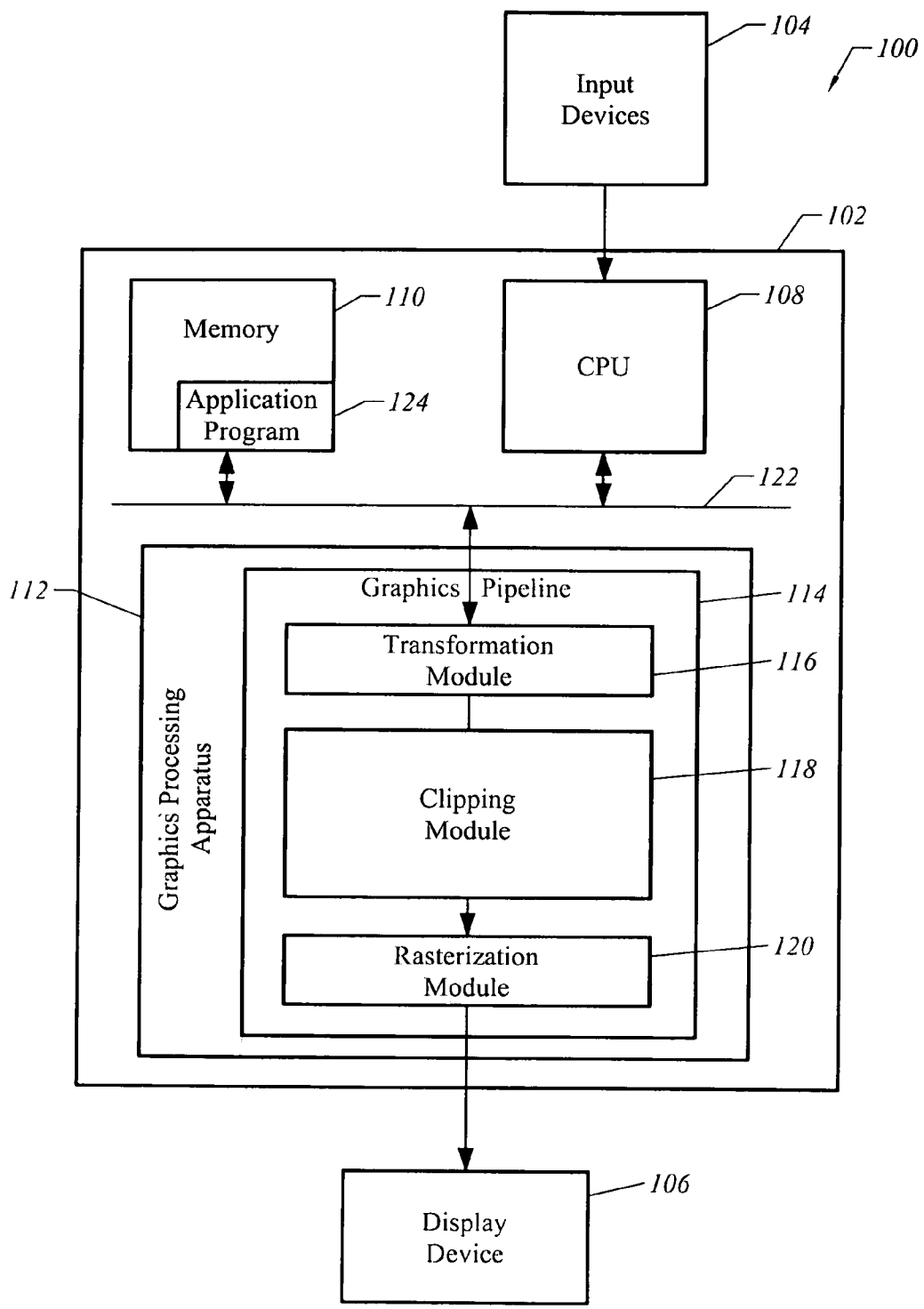
FIG. 1 illustrates a computer system that is implemented in accordance with an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of input devices 104, which can include, for example, a keyboard and a mouse. The computer 102 is also connected to a display device 106, which can be, for example, a television set, a Cathode Ray Tube ("CRT") monitor, or a Liquid Crystal Display ("LCD") monitor.

The computer 102 includes a Central Processing Unit ("CPU") 108, which is connected to a memory 110 over a bus 122. Referring to FIG. 1, the memory 110 stores an application program 124, which can be, for example, a graphics program. The memory 110 can include, for example, a Random Access Memory ("RAM") and a Read Only Memory ("ROM"). As illustrated in FIG. 1, the computer 102 also includes a graphics processing apparatus 112 that is connected to the CPU 108 and the memory 110 over the bus 122. The graphics processing apparatus 112 can be, for example, a Graphics Processing Unit ("GPU").

In the illustrated embodiment, the graphics processing apparatus 112 performs a number of operations to display an object using the display device 106. Referring to FIG. 1, the graphics processing apparatus 112 includes a graphics pipeline 114, which includes a number of modules that are connected to one another and that form different stages of the graphics pipeline 114. In particular, the graphics pipeline 114 includes a transformation module 116, a clipping module 118, and a rasterization module 120. While three modules are illustrated in FIG. 1, it is contemplated that the graphics pipeline 114 can include more or less modules depending on the particular implementation. It is also contemplated that these modules can be combined, sub-divided, or re-ordered for another implementation.

As illustrated in FIG. 1, the transformation module 116 receives a set of graphics primitives that represent the object to be displayed. In the illustrated embodiment, the graphics primitives correspond to polygons. However, it is contemplated that other types of graphics primitives can also be used. Referring to FIG. 1, the transformation module 116 performs a number of transformation operations on the graphics primitives. For example, coordinate data related to the graphics primitives can be rotated, scaled, translated, or converted from one coordinate space into another coordinate space. It is also contemplated that color data, specularity data, or texture data related to the graphics primitives can be modified, such as in connection with lighting operations. The transformation module 116 then delivers the graphics primitives that have been transformed in such manner to the clipping module 118.

Referring to FIG. 1, the clipping module 118 clips the graphics primitives with respect to a set of clipping planes to produce clipped graphics primitives. The clipping module 118 then delivers the clipped graphics primitives to the rasterization module 120. In the illustrated embodiment, the clipping planes define a viewing region, which can be a two-dimensional viewing area or a three-dimensional viewing volume. It is also contemplated that the clipping planes can alternatively, or in conjunction, include a set of model clipping planes, which can be specified by a user to further restrict the viewing region or to remove certain portions of the object from view. It is further contemplated that the clipping planes can alternatively, or in conjunction, include a w=0 plane in homogeneous space. As can be appreciated, the w=0 plane can be positioned at a viewpoint of the viewing region, such that portions of the object that lie on a w<0 side of that plane are behind the viewpoint and are, thus, not visible. The clipping module 118 serves to increase efficiency of the graphics pipeline 114, as further processing on portions of the object that lie outside the viewing region need not be performed. Also, by using the set of model clipping planes, the clipping module 118 allows portions of the object that were previously hidden from view to be visualized. Furthermore, by using the w=0 plane, the clipping module 118 serves to avoid further processing on portions of the object that are behind the viewpoint.

In many instances, clipping is simply required with respect to a single one of the clipping planes. Advantageously, the clipping module 118 operates in accordance with an improved technique that optimizes clipping in those instances. In particular, if a graphics primitive simply requires clipping with respect to a particular one of the clipping planes, the clipping module 118 maps the graphics primitive onto a canonical representation that is defined with respect to that clipping plane. The clipping module 118 then clips the graphics primitive with respect to that clipping plane based on the canonical representation. By operating in such manner, the clipping module 118 allows clipping operations to be optimized with respect to the canonical representation. Such optimization provides improved efficiency in terms of avoiding or reducing unnecessary clipping operations that might otherwise be performed, thus resulting in processing times that are shorter and more predictable as compared with a conventional clipping technique. Indeed, for certain implementations, the processing times can be accelerated by about a factor of two or more. In addition, such optimization translates into reduced implementation cost and complexity for the clipping module 118.

Referring to FIG. 1, the rasterization module 120 performs a number of interpolation operations on the clipped graphics primitives to produce a set of pixels that represent the object to be displayed. For example, coordinate data related to the clipped graphics primitives can be interpolated to assign the pixels to represent the object. It is also contemplated that color data, specularity data, or texture data related to the clipped graphics primitives can be interpolated in connection with pixel assignment. The rasterization module 120 then delivers the pixels for display using the display device 106.

Figure 2:
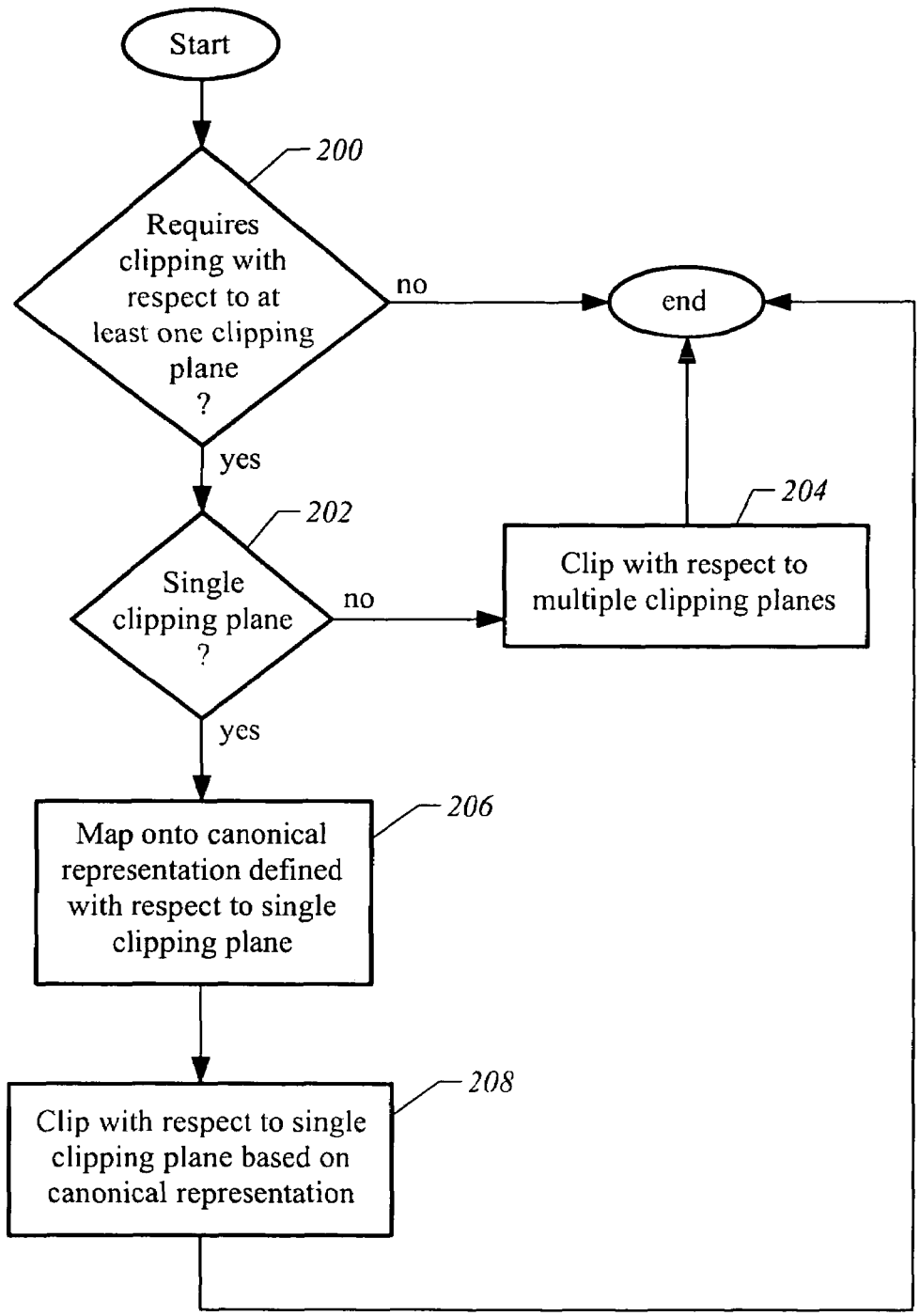
FIG. 2 illustrates a flow chart for clipping a graphics primitive with respect to a set of clipping planes, according to an embodiment of the invention.

Attention next turns to FIG. 2, which illustrates a flow chart for clipping a graphics primitive with respect to a set of clipping planes, according to an embodiment of the invention. In particular, FIG. 2 illustrates operations that can be performed by the clipping module 118 to clip the graphics primitive with respect to a viewing region defined by the clipping planes. In the illustrated embodiment, the graphics primitive is defined by a set of vertices having an initial order that is specified by an application program, such as the application program 124. Different pairs of the vertices define various edges of the graphics primitive.

Referring to FIG. 2, the clipping module 118 initially determines whether the graphics primitive requires clipping with respect to at least one of the clipping planes (block 200). In the illustrated embodiment, the clipping module 118 performs such determination based on whether the graphics primitive intersects at least one of the clipping planes.

If the graphics primitive does not intersect any of the clipping planes, the clipping module 118 either trivially accepts the graphics primitive as being completely within the viewing region or trivially rejects the graphics primitive as being completely outside of the viewing region. In the case that the graphics primitive is trivially accepted, the clipping module 118 simply designates the graphics primitive as a clipped graphics primitive and proceeds to an end configuration. In the case that the graphics primitive is trivially rejected, the clipping module 118 discards the graphics primitive from further processing and proceeds to the end configuration. In either case, the clipping module 118 need not clip any edge of the graphics primitive with respect to any of the clipping planes, thus avoiding or reducing unnecessary clipping operations that might otherwise be performed.

On the other hand, if the graphics primitive intersects at least one of the clipping planes, the clipping module 118 next determines whether that clipping plane corresponds to a single clipping plane with respect to which clipping is required (block 202). In the illustrated embodiment, the clipping module 118 performs such determination based on whether the graphics primitive intersects multiple ones of the clipping planes.

If the graphics primitive intersects multiple ones of the clipping planes, the clipping module 118 clips the graphics primitive with respect to those clipping planes to produce a clipped graphics primitive (block 204) and proceeds to the end configuration. In the illustrated embodiment, the clipping module 118 performs such clipping based on any suitable clipping technique, such as a conventional clipping technique.

On the other hand, if the graphics primitive intersects a single clipping plane, the clipping module 118 next maps the graphics primitive onto a canonical representation that is defined with respect to the single clipping plane (block 206). In the illustrated embodiment, the clipping module 118 performs such mapping by reordering the vertices defining the graphics primitive so as to have a canonical order. Advantageously, the canonical order is specified based on a relative positioning of the vertices with respect to the single clipping plane and is invariant with respect to the initial order. In the illustrated embodiment, the clipping module 118 reorders the vertices while retaining a handedness that is specified by the initial order, namely one that is either counterclockwise or clockwise. As can be appreciated, retaining the handedness is typically desirable so as to retain an orientation of the graphics primitive with respect to a viewpoint, such as in connection with backface culling operations. However, it is contemplated that the handedness can be modified in accordance with another implementation.

Next, the clipping module 118 clips the graphics primitive with respect to the single clipping plane to produce a clipped graphics primitive (block 208) and proceeds to the end configuration. In the illustrated embodiment, the clipping module 118 performs such clipping based on the canonical representation. In particular, to clip a particular edge of the graphics primitive with respect to the single clipping plane, the clipping module 118 accesses a pair of vertices defining that edge based on the canonical order. Since the canonical order is invariant with respect to the initial order, clipping operations are performed in a deterministic manner that is irrespective of the initial order. Moreover, accessing the vertices based on the canonical order allows optimizations in terms of avoiding or reducing unnecessary clipping operations that might otherwise be performed. In particular, as further described below, the canonical order facilitates access to relevant pairs of the vertices so as to simply clip those edges of the graphics primitive that require clipping with respect to the single clipping plane. Also, accessing the vertices based on the canonical order allows the clipping module 118 to be implemented with reduced cost and complexity. For example, the clipping module 118 can be implemented using a micro-coded engine that employs a single set of instructions for clipping with respect to any one of the clipping planes, thus reducing storage requirements and coding complexity for the instructions.

The operations described in connection with FIG. 2 can be further understood with reference to FIG. 3A and FIG. 3B, which illustrate examples of clipping with respect to a clipping plane 300. In the illustrated examples, portions of an object that lie inside of the clipping plane 300 are to be retained for further processing, while portions of the object that lie outside of the clipping plane 300 are to be discarded.

Figure 3A:
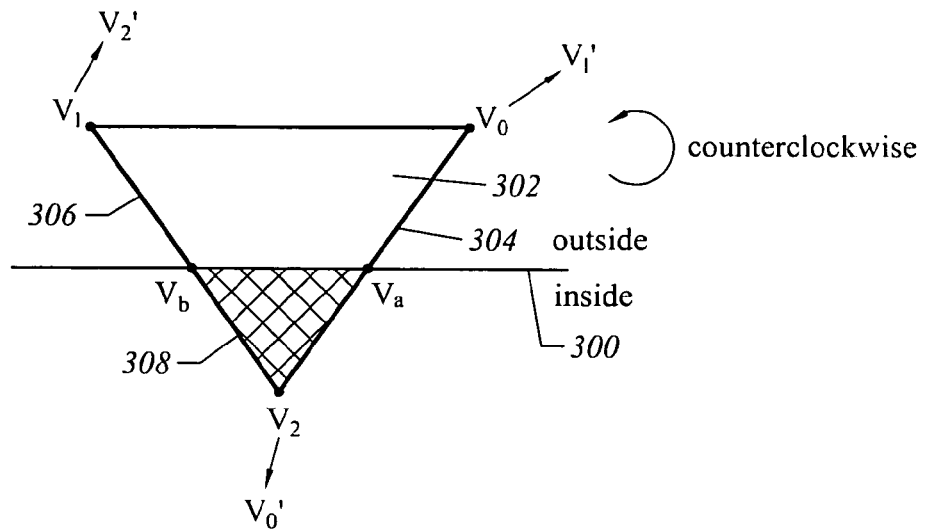
FIG. 3A and FIG. 3B illustrate examples of clipping with respect to a clipping plane, according to an embodiment of the invention.

FIG. 3A illustrates a graphics primitive 302 that corresponds to a triangle, which is a polygon that is simple and convex. As can be appreciated, a polygon is typically referred to as being simple if it has edges that define a single, non-intersecting boundary, and a simple polygon is typically referred to as being convex if it has no internal angles that are greater than 180°. Other examples of polygons that are simple and convex include quadrilaterals, pentagons, hexagons, and heptagons.

As illustrated in FIG. 3A, the graphics primitive 302 is defined by a set of vertices that are initially ordered as ($V_0$, $V_1$, $V_2$), such that vertex $V_0$ has an initial sequence position that is first, vertex $V_1$ has an initial sequence position that is second, and vertex $V_2$ has an initial sequence position that is third. However, it is contemplated that the vertices can have a different initial order, such as ($V_1$, $V_2$, $V_0$) or ($V_2$, $V_0$, $V_1$). Different pairs of the vertices define various edges of the graphics primitive 302. For example, the pair of vertices ($V_2$, $V_0$) define an edge 304 of the graphics primitive 302, and the pair of vertices ($V_1$, $V_2$) define an edge 306 of the graphics primitive 302. In the illustrated example, the initial order of the vertices specifies a handedness that is counterclockwise. However, it is contemplated that the handedness can be clockwise in accordance with another implementation.

Referring to FIG. 3A, the clipping plane 300 is intersected by the pair of edges 304 and 306, and, thus, it can be appreciated that the pair of edges 304 and 306 require clipping with respect to the clipping plane 300. Indeed, since the graphics primitive 302 corresponds to a polygon that is simple and convex, it can be appreciated that the clipping plane 300 is either intersected by none of the edges of the graphics primitive 302 or is intersected by a pair of edges of the graphics primitive 302. In the illustrated example, such appreciation is advantageously exploited to simply clip the pair of edges 304 and 306, without having to clip any remaining edge of the graphics primitive 302.

To facilitate clipping of the pair of edges 304 and 306, the vertices defining the graphics primitive 302 are reordered based on a relative positioning of the vertices with respect to the clipping plane 300. As can be appreciated, the relative positioning of the vertices is typically determined by calculating clip codes. In the illustrated example, reordering of the vertices is performed by determining which one of the vertices is positioned by itself on one side of the clipping plane 300 and assigning a particular canonical sequence position to that vertex. Canonical sequence positions are assigned to remaining ones of the vertices so as to retain the handedness that is specified by the initial order. Referring to FIG. 3A, the vertex $V_2$ is positioned inside of the clipping plane 300, while the vertices $V_0$ and $V_1$ are positioned outside of the clipping plane 300. In the illustrated example, the vertices are reordered as ($V_2$, $V_0$, $V_1$), such that the vertex $V_2$ has a canonical sequence position that is first, while the vertices $V_0$ and $V_1$ have canonical sequence positions that are second and third, respectively. Indeed, the vertices are reordered in such manner irrespective of the initial order of vertices. In such manner, relevant pairs of the vertices defining particular edges of the graphics primitive 302 are readily accessed based on their canonical sequence positions. In particular, the pair of vertices ($V_2$, $V_0$) defining the edge 304 are readily accessed based on a first pair of canonical sequence positions, namely first and second, and the pair of vertices ($V_1$, $V_2$) defining the edge 306 are readily accessed based on a second pair of canonical sequence positions, namely third and first.

As can be appreciated with reference to FIG. 3A, reordering the vertices has effectively mapped the graphics primitive 302 onto a canonical representation that is defined by a set of canonical vertices having a canonical order. In particular, the canonical representation is defined by a set of canonical vertices that are ordered as ($V_0'$, $V_1'$, $V_2'$), and the vertex $V_2$ is mapped onto canonical vertex $V_0'$ that has a canonical sequence position that is first, the vertex $V_0$ is mapped onto canonical vertex $V_1'$ that has a canonical sequence position that is second, and the vertex $V_1$ is mapped onto canonical vertex $V_2'$ that has a canonical sequence position that is third. By referencing the canonical representation, clipping is simply performed on the pair of edges 304 and 306 that require clipping with respect to the clipping plane 300, and the pair of edges 304 and 306 are defined by the pair of canonical vertices ($V_0'$, $V_1'$) and the pair of canonical vertices ($V_0'$, $V_2'$) irrespective of the initial order of the vertices defining the graphics primitive 302.

Referring to FIG. 3A, the pair of edges 304 and 306 are clipped with respect to the clipping plane 300 to produce a clipped graphics primitive 308, which corresponds to a shaded portion of the graphics primitive 302. In the illustrated example, a clipping operation is performed on each edge requiring clipping to determine a new vertex, which corresponds to an intersection of that edge with respect to the clipping plane 300. Since the graphics primitive 302 corresponds to a polygon that is simple and convex, a pair of clipping operations are performed on the pair of edges 304 and 306 to determine new vertices $V_a$ and $V_b$. In the illustrated example, a first clipping operation is performed on the edge 304 by accessing the pair of vertices ($V_2$, $V_0$) based on the first pair of canonical sequence positions, and a second clipping operation is performed on the edge 306 by accessing the pair of vertices ($V_1$, $V_2$) based on the second pair of canonical sequence positions. In such manner, the pair of clipping operations are performed in a deterministic manner that is irrespective of the initial order of the vertices defining the graphics primitive 302.

As illustrated in FIG. 3A, the clipped graphics primitive 308 also corresponds to a triangle. Indeed, since the graphics primitive 302 corresponds to a triangle, it can be appreciated that clipping the graphics primitive 302 with respect to the clipping plane 300 produces either another triangle or a quadrilateral. Referring to FIG. 3A, the clipped graphics primitive 308 is defined by the vertex $V_2$ and the new vertices $V_a$ and $V_b$, which are ordered so as to retain the handedness that is specified by the initial order. However, it is contemplated that the handedness can be modified in accordance with another implementation.

Figure 3B:
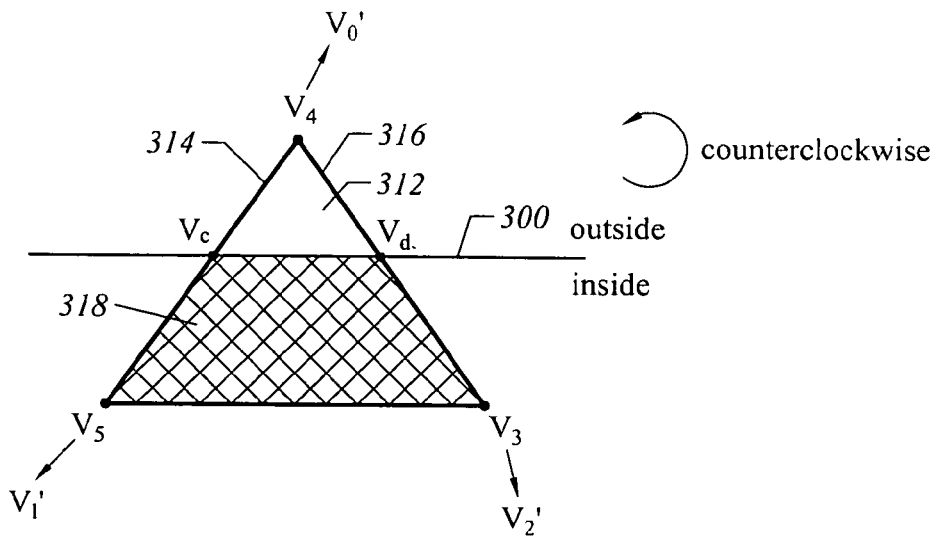

FIG. 3B illustrates another graphics primitive 312 that also corresponds to a triangle. The graphics primitive 312 is defined by a set of vertices that are initially ordered as ($V_3$, $V_4$, $V_5$), such that vertex $V_3$ has an initial sequence position that is first, vertex $V_4$ has an initial sequence position that is second, and vertex $V_5$ has an initial sequence position that is third. However, it is contemplated that the vertices can have a different initial order, such as ($V_4$, $V_5$, $V_3$) or ($V_5$, $V_3$, $V_4$). Different pairs of the vertices define various edges of the graphics primitive 312. For example, the pair of vertices ($V_4$, $V_5$) define an edge 314 of the graphics primitive 312, and the pair of vertices ($V_3$, $V_4$) define an edge 316 of the graphics primitive 312. As in the previous example, the initial order of the vertices specifies a handedness that is counterclockwise. However, it is contemplated that the handedness can be clockwise in accordance with another implementation.

Referring to FIG. 3B, the clipping plane 300 is intersected by the pair of edges 314 and 316, and, thus, it can be appreciated that the pair of edges 314 and 316 require clipping with respect to the clipping plane 300. As in the previous example, processing proceeds by simply clipping the pair of edges 314 and 316, without having to clip any remaining edge of the graphics primitive 312.

To facilitate clipping of the pair of edges 314 and 316, the vertices defining the graphics primitive 312 are also reordered based on a relative positioning of the vertices with respect to the clipping plane 300. Referring to FIG. 3B, the vertex $V_4$ is positioned outside of the clipping plane 300, while the vertices $V_5$ and $V_3$ are positioned inside of the clipping plane 300. Accordingly, the vertices are reordered as ($V_4$, $V_5$, $V_3$), such that the vertex $V_4$ has a canonical sequence position that is first, while the vertices $V_5$ and $V_3$ have canonical sequence positions that are second and third, respectively. Indeed, the vertices are reordered in such manner irrespective of the initial order of vertices. In such manner, the pair of vertices ($V_4$, $V_5$) defining the edge 314 are readily accessed based on a first pair of canonical sequence positions, namely first and second, and the pair of vertices ($V_3$, $V_4$) defining the edge 316 are readily accessed based on a second pair of canonical sequence positions, namely third and first.

As can be appreciated with reference to FIG. 3B, reordering the vertices has effectively mapped the graphics primitive 312 onto a canonical representation that is defined by a set of canonical vertices that are ordered as ($V_0'$, $V_1'$, $V_2'$), such that the vertex $V_4$ is mapped onto canonical vertex $V_0'$ that has a canonical sequence position that is first, the vertex $V_5$ is mapped onto canonical vertex $V_1'$ that has a canonical sequence position that is second, and the vertex $V_3$ is mapped onto canonical vertex $V_2'$ that has a canonical sequence position that is third. By referencing the canonical representation, clipping is simply performed on the pair of edges 314 and 316 that require clipping with respect to the clipping plane 300, and the pair of edges 314 and 316 are defined by the pair of canonical vertices ($V_0'$, $V_1'$) and the pair of canonical vertices ($V_0'$, $V_2'$) irrespective of the initial order of the vertices defining the graphics primitive 312.

Referring to FIG. 3B, the pair of edges 314 and 316 are clipped with respect to the clipping plane 300 to produce a clipped graphics primitive 318, which corresponds to a shaded portion of the graphics primitive 312. As illustrated in FIG. 3B, a pair of clipping operations are performed on the pair of edges 314 and 316 to determine new vertices $V_c$ and $V_d$. In particular, a first clipping operation is performed on the edge 314 by accessing the pair of vertices ($V_4$, $V_5$) based on the first pair of canonical sequence positions, and a second clipping operation is performed on the edge 316 by accessing the pair of vertices ($V_3$, $V_4$) based on the second pair of canonical sequence positions. In such manner, the pair of clipping operations are performed in a deterministic manner that is irrespective of the initial order of the vertices defining the graphics primitive 312.

As illustrated in FIG. 3B, the clipped graphics primitive 318 corresponds to a quadrilateral. In particular, the clipped graphics primitive 318 is defined by the vertices $V_5$ and $V_3$ and the new vertices $V_c$ and $V_d$, which are ordered so as to retain the handedness that is specified by the initial order. However, it is contemplated that the handedness can be modified in accordance with another implementation.

The foregoing provides an overview of some embodiments of the invention. Attention next turns to FIG. 4, which illustrates a clipping module 400 that is implemented in accordance with an embodiment of the invention. The clipping module 400 includes a vertex memory 402, which stores a set of initial vertices defining a graphics primitive and that are initially ordered as ($V_0$, $V_1$, $V_2$). The vertex memory 402 can be implemented as, for example, a RAM that stores the initial vertices based on their initial sequence positions.

Figure 4:
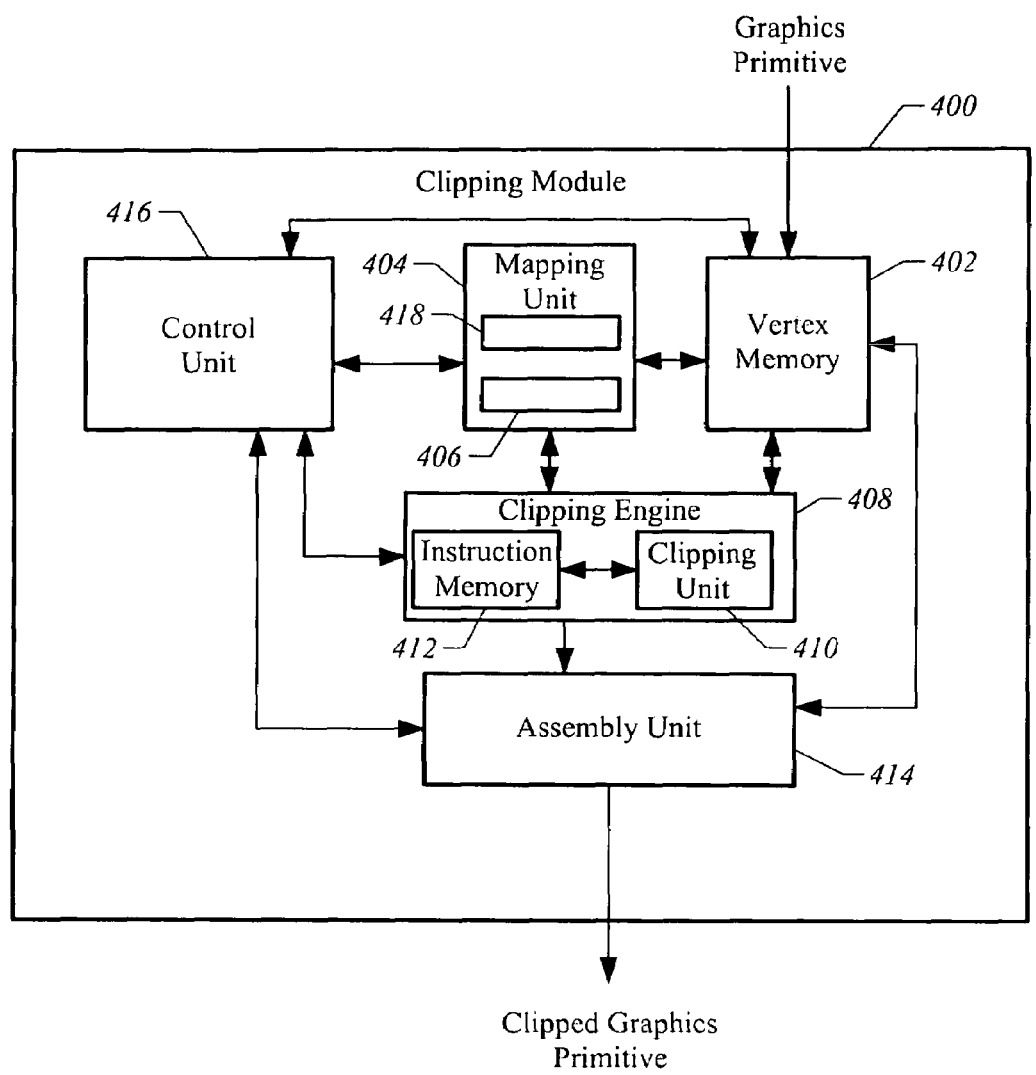
FIG. 4 illustrates a clipping module that is implemented in accordance with an embodiment of the invention.

As illustrated in FIG. 4, the clipping module 400 also includes a clipping engine 408 that is connected to the vertex memory 402. The clipping engine 408 accesses the initial vertices to clip the graphics primitive with respect to a set of clipping planes. In the illustrated embodiment, the graphics primitive corresponds to a polygon that is simple and convex, and the clipping engine 408 is implemented to perform a pair of clipping operations if the graphics primitive simply requires clipping with respect to a single one of the clipping planes. In particular, the clipping engine 408 performs the pair of clipping operations on a pair of edges of the graphics primitive that intersect that clipping plane. Each of the pair of clipping operations specifies a relevant pair of the initial vertices based on a pair of canonical sequence positions and produces a new vertex based on that pair of the initial vertices. In the illustrated embodiment, the clipping engine 408 performs the pair of clipping operations substantially in parallel. However, it is also contemplated that the pair of clipping operations can be performed sequentially. Referring to FIG. 4, the clipping engine 408 is implemented as a micro-coded engine and includes a clipping unit 410 and an instruction memory 412 that is connected to the clipping unit 410. The instruction memory 412 can be implemented as, for example, a ROM that stores computer code for performing the pair of clipping operations.

As illustrated in FIG. 4, the clipping module 400 also includes a mapping unit 404, which is connected to the vertex memory 402 and the clipping engine 408. The mapping unit 404 sorts the initial vertices so as to assign canonical sequence positions to the initial vertices. In particular, the mapping unit 404 sorts the initial vertices so that relevant pairs of the initial vertices are assigned the canonical sequence positions specified by the pair of clipping operations. Referring to FIG. 4, the mapping unit 404 sorts the initial vertices based on contents of a mapping table 418, which can be implemented as, for example, a ROM. Table 1 below provides an example of the contents of the mapping table 418.

TABLE 1

| Positioning of Initial Vertices ($V_0$, $V_1$, $V_2$) with respect to Clipping Plane | Sorted Initial Vertices |
| --- | --- |
| if $V_0$ is on one side, while $V_1$ and $V_2$ are on another side | ($V_0$, $V_1$, $V_2$) |
| if $V_2$ is on one side, while $V_0$ and $V_1$ are on another side | ($V_2$, $V_0$, $V_1$) |
| if $V_1$ is on one side, while $V_2$ and $V_0$ are on another side | ($V_1$, $V_2$, $V_0$) |

Referring to FIG. 4, the mapping unit 404 performs sorting operations via indirect or virtual addressing and includes a vertex pointer memory 406. The vertex pointer memory 406 can be implemented as, for example, a RAM that stores a set of vertex pointers based on the canonical sequence positions assigned to the initial vertices. Each of the vertex pointers references a memory location at which a corresponding one of the initial vertices is stored in the vertex memory 402. As can be appreciated, use of the vertex pointers is advantageous in terms of reducing the amount of data manipulations in connection with the sorting operations. In particular, the vertex pointers allow the initial vertices to be accessed based on their canonical sequence positions, without having to physically reorder the initial vertices stored in the vertex memory 402. However, it is also contemplated that the mapping unit 404 can perform the sorting operations via such physical reordering.

In the illustrated embodiment, the clipping module 400 also includes an assembly unit 414, which is connected to the vertex memory 402 and the clipping engine 408. The assembly unit 414 defines a clipped graphics primitive that is produced by clipping the graphics primitive. In particular, the assembly unit 414 defines the clipped graphics primitive based on at least one of the initial vertices and the new vertices that are produced by the pair of clipping operations.

Referring to FIG. 4, the clipping module 400 further includes a control unit 416, which is connected to and coordinates operations that are performed by the vertex memory 402, the mapping unit 404, the clipping engine 408, and the assembly unit 414. The control unit 416 can be implemented in any suitable manner, such as using computer code, hardwired circuitry, or a combination of computer code and hardwired circuitry.

It should be appreciated that the specific embodiments of the invention discussed above are provided by way of example, and various other embodiments are encompassed by the invention. Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Some embodiments of the invention can be implemented using computer code in place of, or in combination with, hardwired circuitry. For example, with reference to FIG. 1, various modules of the graphics pipeline 114 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A clipping module, comprising:
a mapping unit configured to map a graphics primitive onto a canonical representation, wherein the graphics primitive is defined by vertices having an initial order, and the mapping unit is configured to map the graphics primitive onto the canonical representation by reordering the vertices so as to have a canonical order that is invariant with respect to the initial order; and
a clipping engine connected to the mapping unit, the clipping engine configured to clip the graphics primitive with respect to a clipping plane based on the canonical representation,
wherein the canonical representation is defined with respect to the clipping plane so as to accelerate clipping the graphics primitive,
wherein the mapping unit is configured to reorder the vertices by:
determining which one of the vertices is positioned on one side of the clipping plane, while all remaining ones of the vertices are positioned on another side of the clipping plane;
assigning a predetermined sequence position to the one of the vertices that is determined to be positioned on the one side of the clipping plane; and
assigning respective sequence positions to the remaining ones of the vertices so as to retain a handedness specified by the initial order.

2. The clipping module of claim 1, wherein the predetermined sequence position is a first sequence position.

3. The clipping module of claim 1, wherein the initial order is a first initial order, and the mapping unit is configured to reorder the vertices so as to have the same canonical order even if the graphics primitive is defined by the vertices having a second initial order that is different from the first initial order.

4. The clipping module of claim 1, wherein the one of the vertices is positioned inside of the clipping plane, while the remaining ones of the vertices are positioned outside of the clipping plane.

5. The clipping module of claim 1, wherein the one of the vertices is positioned outside of the clipping plane, while the remaining ones of the vertices are positioned inside of the clipping plane.

6. The clipping module of claim 1, further comprising:
an assembly unit connected to the clipping engine, the assembly unit configured to define a clipped graphics primitive based on clipping the graphics primitive.

7. A graphics processing apparatus, comprising:
a graphics pipeline including
a clipping module configured to:
determine that a graphics primitive intersects a clipping plane, wherein the graphics primitive is defined by vertices having an initial order;
determine which one of the vertices is positioned on one side of the clipping plane, while all remaining ones of the vertices are positioned on another side of the clipping plane;
sort the vertices so as to have a canonical order that is defined with respect to the clipping plane and is invariant with respect to the initial order, wherein the vertices are sorted by assigning a predetermined sequence position to the one of the vertices that is determined to be positioned on the one side of the clipping plane; and
clip the graphics primitive with respect to the clipping plane based on the canonical order.

8. The graphics processing apparatus of claim 7, wherein the clipping plane corresponds to a single clipping plane that is intersected by the graphics primitive.

9. The graphics processing apparatus of claim 7, wherein the clipping module is configured to sort the vertices by assigning respective sequence positions to the remaining ones of the vertices so as to retain a handedness specified by the initial order.

10. The graphics processing apparatus of claim 7, wherein the clipping module is configured to clip the graphics primitive with respect to the clipping plane by accessing the vertices based on the canonical order.

11. A graphics processing method, comprising:
determining a positioning of vertices defining a graphics primitive with respect to a clipping plane, the vertices having an initial order, wherein the determining the positioning includes determining which one of the vertices is positioned on one side of the clipping plane, while all remaining ones of the vertices are positioned on another side of the clipping plane, wherein the one of the vertices that is positioned on the one side of the clipping plane has an initial sequence position;
sorting the vertices based on the positioning so as to have a canonical order, wherein the sorting the vertices includes sorting the vertices while retaining a handedness specified by the initial order, wherein the sorting the vertices includes assigning a canonical sequence position to the one of the vertices that is determined to be positioned on the one side of the clipping plane, the canonical sequence position being predetermined and being irrespective of the initial sequence position; and
clipping the graphics primitive with respect to the clipping plane to produce an output for display, wherein the clipping the graphics primitive is accelerated by accessing the vertices based on the canonical order.

12. The graphics processing method of claim 11, wherein the sorting the vertices includes sorting the vertices so as to have the same canonical order irrespective of the initial order.

13. The graphics processing method of claim 11, further comprising:
accessing a first pair of the vertices based on the canonical order to clip a first edge of the graphics primitive with respect to the clipping plane.

14. The graphics processing method of claim 13, further comprising:
accessing a second pair of the vertices based on the canonical order to clip a second edge of the graphics primitive with respect to the clipping plane.

15. The graphics processing method of claim 11, wherein the initial sequence position is a first initial sequence position, and the sorting the vertices includes assigning the same canonical sequence position to the one of the vertices even if the one of the vertices has a second initial sequence position that is different from the first initial sequence position.

* * * * *